United States Patent
Krejci

(10) Patent No.: US 8,684,363 B2
(45) Date of Patent: Apr. 1, 2014

(54) COMBY TWO-SIDED OVERLAIN GASKET FOR SEALING OF DISMOUNTABLE FLANGED JOINTS

(75) Inventor: Miroslav Krejci, Moravsky Krumlov (CZ)

(73) Assignee: MICO, SPOL., S.R.O, Trebic (CZ)

( * ) Notice: Subject to any disclaimer, the term of this patent is extended or adjusted under 35 U.S.C. 154(b) by 375 days.

(21) Appl. No.: 13/003,932

(22) PCT Filed: Jun. 3, 2009

(86) PCT No.: PCT/CZ2009/000078
§ 371 (c)(1),
(2), (4) Date: Jan. 13, 2011

(87) PCT Pub. No.: WO2010/006561
PCT Pub. Date: Jan. 21, 2010

(65) Prior Publication Data
US 2011/0115170 A1    May 19, 2011

(30) Foreign Application Priority Data

Jul. 16, 2008 (CZ) .................................. 2008-445
Feb. 18, 2009 (CZ) .................................. 2009-96

(51) Int. Cl.
*H02G 15/04* (2006.01)
*F16L 17/073* (2006.01)
*F16L 17/06* (2006.01)
*F16L 17/00* (2006.01)

(52) U.S. Cl.
USPC ............................ 277/612; 277/609; 277/626

(58) Field of Classification Search
USPC ......... 277/608, 609, 648, 652, 654, 598, 612, 277/626
See application file for complete search history.

(56) References Cited

U.S. PATENT DOCUMENTS 2,269,486 A * 1/1942 Santoro .......................... 277/612
2,307,440 A * 1/1943 Wilson .......................... 277/612
(Continued)

FOREIGN PATENT DOCUMENTS

DE    26 29 548    1/1978
DE    91 00 438.1   5/1991
(Continued)

OTHER PUBLICATIONS

PCT Written Opinion.

*Primary Examiner* — Vishal Patel
*Assistant Examiner* — Nicholas L Foster
(74) *Attorney, Agent, or Firm* — Dority & Manning, P.A.

(57) ABSTRACT

A comb-like two-sided overlain gasket for sealing of dismountable flanged joints includes two sealing contact surfaces. Each contact surface defines a plurality of V shaped concentric grooves. Each of the V shaped grooves has an opening angle of 90 degrees. Each of the contact surfaces includes concentric surfaces that are disposed between each of the grooves. The concentric surfaces are created in a single plane and include a constant width that ranges from 0.2 mm to 0.6 mm. A bottom portion of the concentric grooves are rounded and have a radius that ranges from 0.3 mm to 0.5 mm. The comb-like two-sided overlain gasket also includes one of a sealing foil or a sealing plate that overlays the sealing contact surfaces and that extend beyond the concentric grooves. When compressed, the concentric grooves define a smaller volume than the volume of the sealing foil or the sealing plate.

11 Claims, 4 Drawing Sheets

(56) References Cited

U.S. PATENT DOCUMENTS

| | | | | |
|---|---|---|---|---|
| 2,543,963 A | * | 3/1951 | Gaffin | 285/373 |
| 3,747,963 A | * | 7/1973 | Shivak | 285/336 |
| 3,930,656 A | * | 1/1976 | Jelinek | 277/611 |
| 5,421,594 A | * | 6/1995 | Becerra | 277/608 |
| 5,511,797 A | * | 4/1996 | Nikirk et al. | 277/609 |
| 6,092,811 A | * | 7/2000 | Bojarczuk et al. | 277/627 |
| 6,290,237 B1 | * | 9/2001 | Graupner | 277/603 |
| 7,121,556 B2 | * | 10/2006 | Barth et al. | 277/596 |
| 2005/0121859 A1 | * | 6/2005 | Seidel et al. | 277/628 |
| 2011/0140371 A1 | * | 6/2011 | Strydom | 277/609 |

FOREIGN PATENT DOCUMENTS

| | | | | |
|---|---|---|---|---|
| DE | 9100438 | * | 5/1991 | F16J 15/12 |
| DE | 42 30 322 A1 | | 3/1994 | |
| DE | 93 17 130.7 | | 4/1994 | |
| DE | 20 2005 006 698 U1 | | 8/2005 | |
| EP | 0 922 897 A2 | | 6/1999 | |

* cited by examiner

COMBY TWO-SIDED OVERLAIN GASKET FOR SEALING OF DISMOUNTABLE FLANGED JOINTS

FIELD OF THE INVENTION

The invention relates to a comb-like two-sided overlain gasket for sealing of dismountable flanged joints such as flanged joints on pipes, fittings, pressure vessels, etc. More specifically, the invention relates to a comb-like two-sided gasket that includes V shaped grooves that are overlain by a sealing foil or a sealing plate on both sides of the gasket, the grooves having an opening angle of 90°.

BACKGROUND OF THE INVENTION

Known comb-like gaskets for dismountable flanged joints, fittings, pressure vessels, etc., are as a rule, ring shaped or annular shape and have cross-sections of various shapes. This usually depends on the material used for sealing of the flanged joint. As a rule, the flanges are mutually connected by means of screws, through which a dismountable connection is obtained. The dismountable connection is advantageous for executing repairs, reconstructions, etc.

There are known comb-like gaskets, which are made of soft alloy steel or austenitic steel. Mostly, the comb-like gasket is overlain on both sides with sealing board or foil which comprises expanded graphite, expanded Teflon, Thermiculite, mica, aluminium, nickel, silver, etc. Selection of a particular material used for the sealing plate or sealing foil is affected especially by chemical-physical properties of the media, which flows within the pipeline system or which is present in the sealed pressure vessel.

Gaskets for flanged joints are usually ring shaped and are disposed along contact sealing surfaces of the flanges. The gaskets include concentric grooves having a V shape with an opening angle of 90°, a spacing of 1.5 mm and a depth of 0.75 mm. The sealing foil conforms to the V shaped grooves when compressed between the contact sealing surfaces of the flanges. Through this transformation of the sealing lining, the effectiveness of the seal at the flanged joint is increased. The most efficient seal with the longest operational reliability of the sealed flanged joint is influenced not only by the chemical properties of the medium flowing within the pipeline, but also by its temperature and pressure. The seal is also affected by variations in pressure and/or temperature that result during operation of the pipeline, particularly when the variations in pressure and/or temperature are relatively large. The effectiveness of the seal is also influenced by a compressive force caused by fasteners such as screws or bolts which mutually join and tighten the flanges.

A known comb-like gasket is overlain on both sides of the gasket with a foil of expanded graphite that features very good sealing properties even at high specific pressures and high temperatures. Upon compression of the comb-like gasket between the sealing surfaces of the flanges, the foil conforms into the grooves. During installation it is necessary to compress the comb-like gasket such that a continuous layer of expanded graphite is present between peaks of the grooves of the comb-like gasket and a sealing surface of the flange. If a direct contact occurs between the groove peaks of the comb-like gasket and the sealing surface of the flange, the foil of expanded graphite will be cut through, thereby devaluing the effectiveness of the seal. As a result, a repair is required to replace the seal. Moreover, in such cases there are quite often galls on the sealing surfaces of the flanges which result from the contact between the groove peaks and the sealing surface of the flange. These galls may also necessitate repair to the sealing surfaces of the flanges which increases costs and time required for executing the repair.

The above mentioned issues which result from the direct contact of the comb-like gasket with the sealing surfaces of the flanges is improved by a comb-like gasket including the V shaped grooves having an opening angle of 90° between the individual grooves. Using an adhesive to adhere the sealing foil to the comb-like gasket facilitates sticking of the sealing foil to the comb-like gasket. In addition, by sticking the sealing foil to the comb-like gasket, installation and maintenance of the seal are improved. It is advantageous to use an adhesive having a wide thermal operating range.

In some cases, the flanged joints are applied in pipeline systems that are exposed to considerable mechanical and heat stresses. In these cases, especially at flanged joints of larger diameters, the stresses worsen the effectiveness of the seal, the service life and reliability of the sealing joint and the level of achievable surface parallelism of contact surfaces between the connected flanges. Non-parallelism of the contact connection surfaces of the flanges as well as possible surface deformations and irregularities in those surfaces complicate installation and negatively influence the effectiveness of the seal, especially in a case when an annular comb-like two-sided overlain gasket is used for sealing of the joint.

The objective of the invention is to achieve improvement of the background art and to optimise conditions for production of an operationally reliable seal at the flanged joints, as well as a reduction of the negative impact of non-parallelism and deformations of the sealing surfaces of the flanges being connected. In addition, this invention may be utilized to improve installation and repair activities.

BRIEF DESCRIPTION OF THE INVENTION

Advantages of the invention are set forth below in the following description, or may be obvious from the description, or may be learned through practice of the invention.

One embodiment of the present invention is a comb-like two-sided overlain gasket for sealing of dismountable flanged joints. The comb-like two-sided overlain gasket includes two sealing contact surfaces. Each contact surface defines a plurality of V shaped concentric grooves. Each of the V shaped grooves has an opening angle of 90 degrees. Each of the contact surfaces includes concentric surfaces that are disposed between each of the grooves. The concentric surfaces are created in a single plane and include a constant width that ranges from 0.2 mm to 0.6 mm. A bottom portion of the concentric grooves are rounded and have a radius that ranges from 0.3 mm to 0.5 mm. The comb-like two-sided overlain gasket also includes one of a sealing foil or a sealing plate that overlays the sealing contact surfaces and that extend beyond the concentric grooves. When compressed, the concentric grooves define a smaller volume than the volume of the sealing foil or the sealing plate.

The comb-like two-sided overlain gasket may further include sealing contact surfaces. The sealing contact surfaces as well as the contact surfaces of the flanges have a standard hardness of 1.6 to 3.2. Each of the sealing contact surfaces may comprise at least two groups of the grooves where each group has a different depth and the individual groups of the grooves are separated by a continuous recess that extends annularly around the comb-like gasket. The comb-like two-sided overlain gasket may further comprise an adhesive that is disposed on the sealing contact surfaces between the gasket and the sealing foil or the sealing plate. The adhesive may have a melting point of about 50° C.

Each of the sealing contact surfaces may be created on an independent annular part. Each annular part includes an inner diameter and an outer diameter. Each of the inner diameters defines a bent portion that extends towards the other annular part. Each bent portion is connected at a contact place and the outer diameters mutually overlap. An annular chamber may be defined between the annular parts. The annular chamber is at least partially defined between the bent portions of the inner diameters and the mutually overlapping outer diameters. The annular chamber may comprise a square or rectangular cross-section. In one embodiment, the connection of the bent portions of both annular parts may be formed by a fixed edge joint. In another embodiment, the connection of the bent portions of both annular parts is formed by a dismountable joint. In one embodiment, at least one of the two annular parts is elastic.

In further embodiments, a springy or elastic insert is disposed within the annular chamber. The springy insert may comprise expanded graphite.

Those of ordinary skill in the art will better appreciate the features and aspects of such embodiments, and others upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
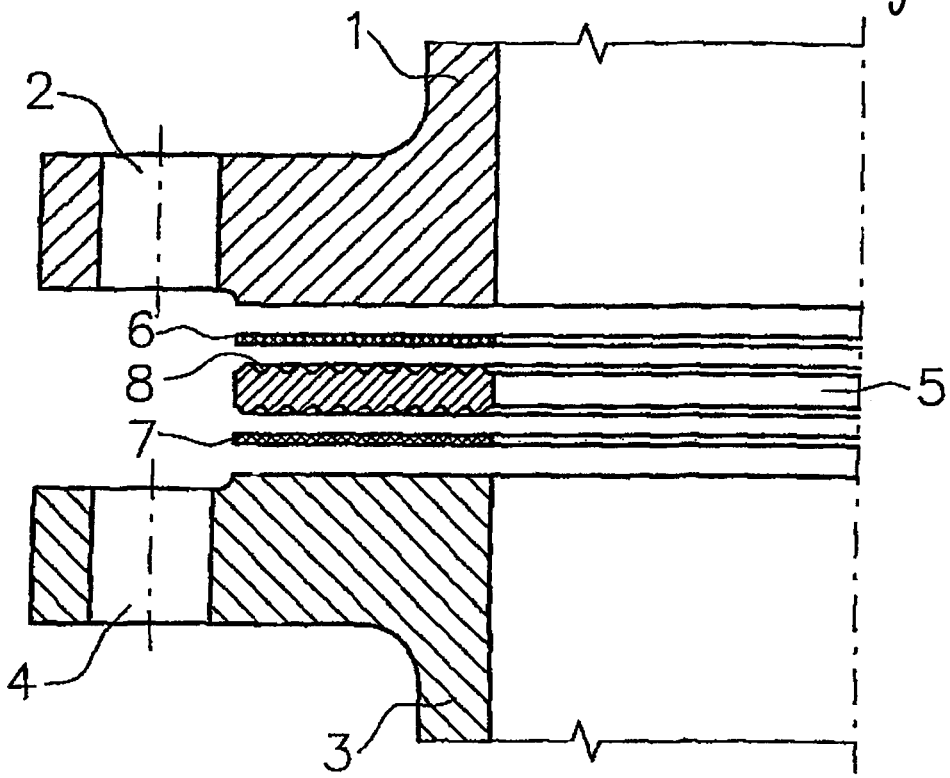
FIG. 1 shows a partial axial cross-section taken through flanges that connect a pipeline including a comb-like gasket having two sides and a sealing foil that is overlain across each of the two sides, each of the comb-like gasket and the sealing foil being annular shaped.

As shown in FIG. 1, an upper flange 1 is provided at an end of a pipeline (not shown). The upper flange 1 is provided with holes 2 designed for receiving connection screws (not shown). A lower flange 3 is provided at the end of a connected pipeline (not shown) and is provided with holes 4 for receiving the mentioned connection screws. This flanged joint is commonly known. A comb-like annular gasket 5 is inserted into a space defined between the contact surfaces of the flanges 1 and 3. The comb-like gasket 5 is on two sides overlain with a sealing foil or sealing plate 6, 7 also of an annular shape, whose outer as well as inner diameter is preferably identical with an inner and outer diameter of the annular comb-like gasket 5. The sealing contact surfaces of the annular comb-like gasket 5 are provided with concentric grooves 8, between which on both sealing contact surfaces there are created concentric surfaces Y. The width of the surface Y is usually selected in the range between 0.2 mm to 0.6 mm. The width of the surface Y depends not only on the material used for production of the sealing foil or sealing plate 6, 7, but also on the pressure, temperature and medium, that flows through the pipeline which is connected by the mentioned flanged joint. A bottom section of the grooves 8 are rounded R and have a diameter of 0.3 to 0.5 mm. The rounding R positively influences distribution of tension caused by the sealing foil or foil plate 6, 7 towards the bottom of the grooves 8 upon tightening of the flanged joint by a compression force. This structural provision positively influences reliability as well as total service life of the seal formed at the flanged joint.

Figure 2:
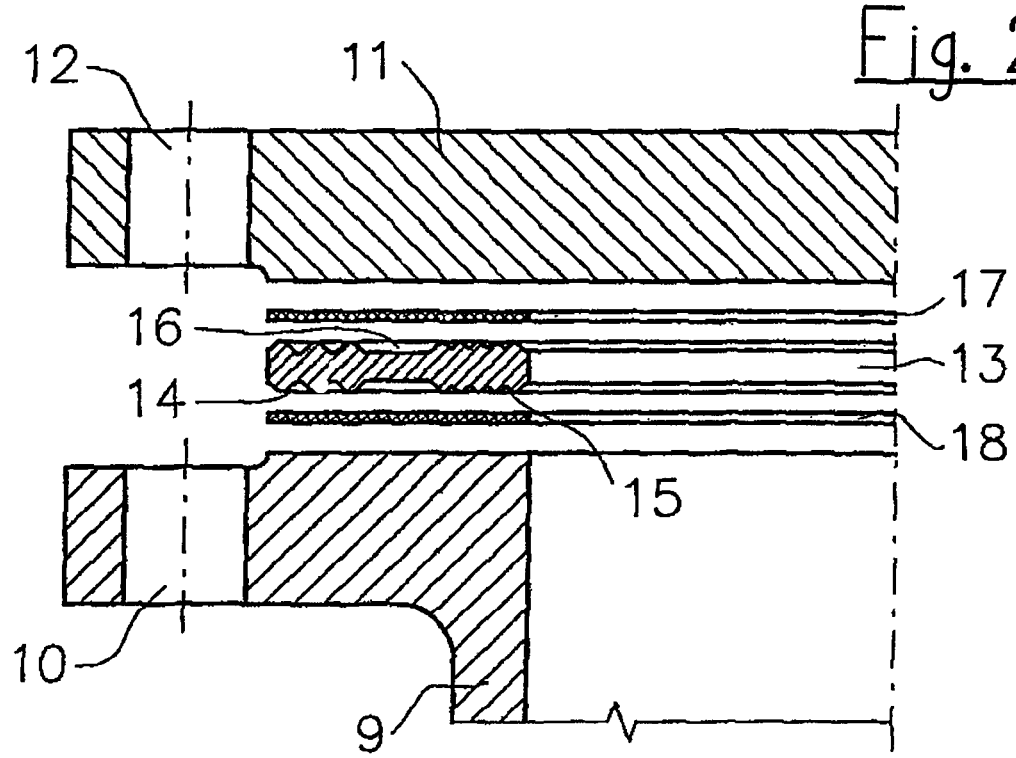
FIG. 2 shows a partial cross-section taken through a flange that forms the end of a pressure vessel including a two-sided overlain comb-like gasket having two groups of grooves of a different depth.
Figure 3:
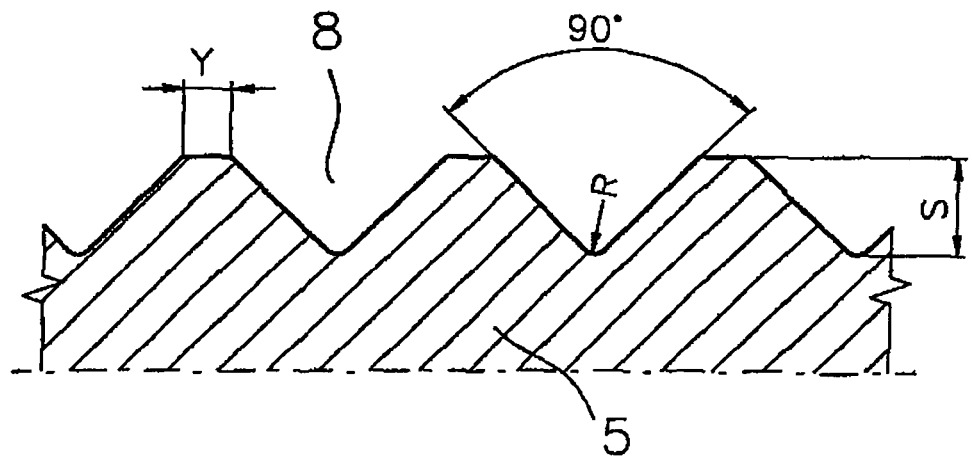
FIG. 3 shows an enlarged partial cross-section of a profile of grooves formed on the comb-like gasket.

As shown in FIG. 2, a pressure vessel (not shown) includes a flange 9. The flange 9 is provided with holes 10 for receiving the connection screws (not shown). The pressure vessel is closed by a covering flange H. The covering flange 11 also includes on its perimeter holes 12 for receiving the connection screws (not shown). This method of closing a pressure vessel is commonly known.

An annular comb-like gasket 13 is disposed between the flange 9 of the pressure vessel and the covering flange 11. In this embodiment, the comb-like gasket includes contact sealing surfaces having two systems of concentric annular grooves 14, 15 of different depths S. A system of deeper concentric grooves 14 is separated from a system of shallower concentric grooves 15 by an annular recess 16. Also this embodiment of the annular comb-like gasket 13 is on both sides overlain with the sealing foil or sealing plate 17, 18. A technical benefit of having the different depths of the annular grooves 14, 15 is that the sealing effect is enhanced, especially in the case where surface deformations on the covering flange 11, which may occur due to pressure in the pressure vessel.

Figure 4:
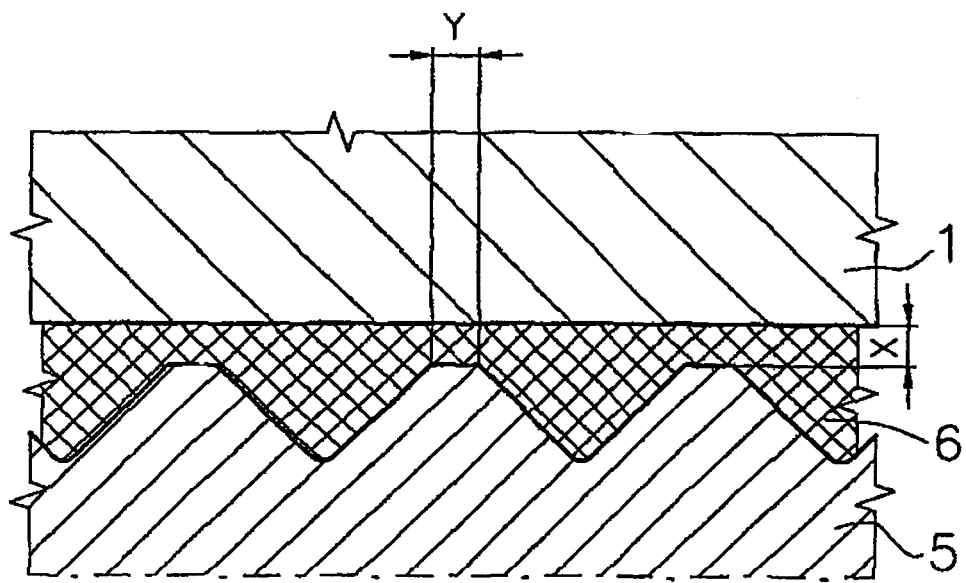
FIG. 4 shows an enlarged partial cross-section of the flange, the comb-like gasket and the sealing foil with the comb-like gasket and the sealing foil in a compressed state.

After the screws of the flanged joint are tightened, the sealing foil or the sealing plate 6, 7 is compressed along with the comb-like gasket 5 so that in the space between contact surfaces of the flanges 1, 3, 9, 11, and surfaces Y between the grooves 8 of comb-like gasket 5 there is to be found a compact integral layer X of a material of the sealing foil or the sealing plate 6, 7 or 17, 18 respectfully. Thickness of this compact integral layer X is in practice determined to be in the range of 0.02 mm to 0.3 mm depending on material used for the sealing foil or sealing plate 6, 7 or 17, 18 respectfully, as well as on pressure and temperature of medium being sealed by the flanged joint. A thickness of a compact integral layer X (FIG. 4) of the sealing foil or of sealing plate 6, 7, 17, 18 after tightening of the flanged joint has an immediate impact on the achieved sealing effect. Inadequate thickness of the layer X of the sealing foil or of sealing plate 6, 7, 17, 18 causes an undesirable reduction of sealing effect in the flanged joint. This may be caused by over tightening of the flanged joint which causes the sealing foil or the sealing plate 6, 7, 17, 18 to push away from the flanged joint.

Tightening of the flanged joint results in an inner space or volume defined between the grooves 8 of the comb-like gasket which is smaller than the volume of the sealing foil or of the sealing plate 6, 7, 17, 18.

To facilitate installation and maintenance, it is advantageous if the sealing foil or sealing plate 6, 7, 17, 18 is stuck on both sides of the comb-like gasket using an adhesive having a relatively low melting point, for example approximately 50° C. As a result, heat may be applied to remove the damaged sealing foil or sealing plate 6, 7, and 17, 18.

The described technical solution according to the invention is applicable for pipelines and pressurised systems in which the sealed medium has a high transportation pressure, e.g. a pressure of 100-150 MPa, and varying temperatures that may reach more than 500° C. The technical solution according to the invention may also be applied to systems that operate under a vacuum.

The sealing foil or sealing plate 6, 7, 17, 18 may comprise of any material which is suitable for the parameters and properties of the sealed medium. For example, in addition to expanded graphite the sealing foil or sealing plate 6, 7, 17, 18 may comprise of expanded Teflon, silver, Thermiculite, aluminium, special fibrous-rubber materials, etc.

Figure 5:
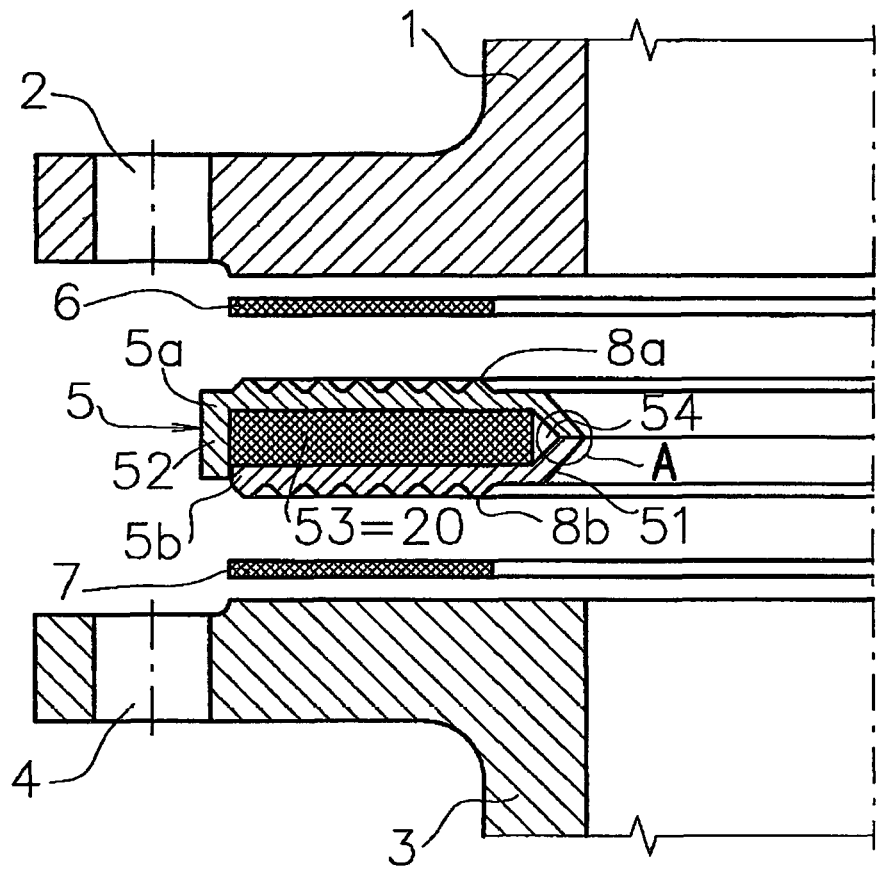
FIG. 5 shows a partial axial cross section of the flanges that connect the pipeline including the comb-like gasket, a springy insert disposed within the comb-like gasket and the sealing foil disposed on both sides of the comb-like gasket.
Figure 6:
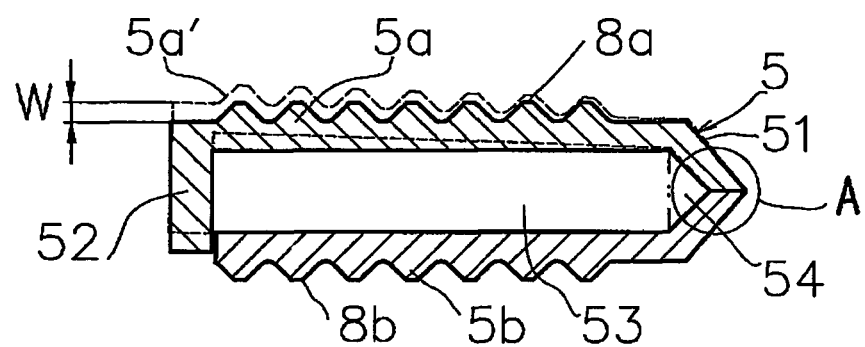
FIG. 6 shows a cross section of the comb-like gasket with marked difference of compressibility between the surfaces of the gasket as a result of axial compression.
Figure 7:
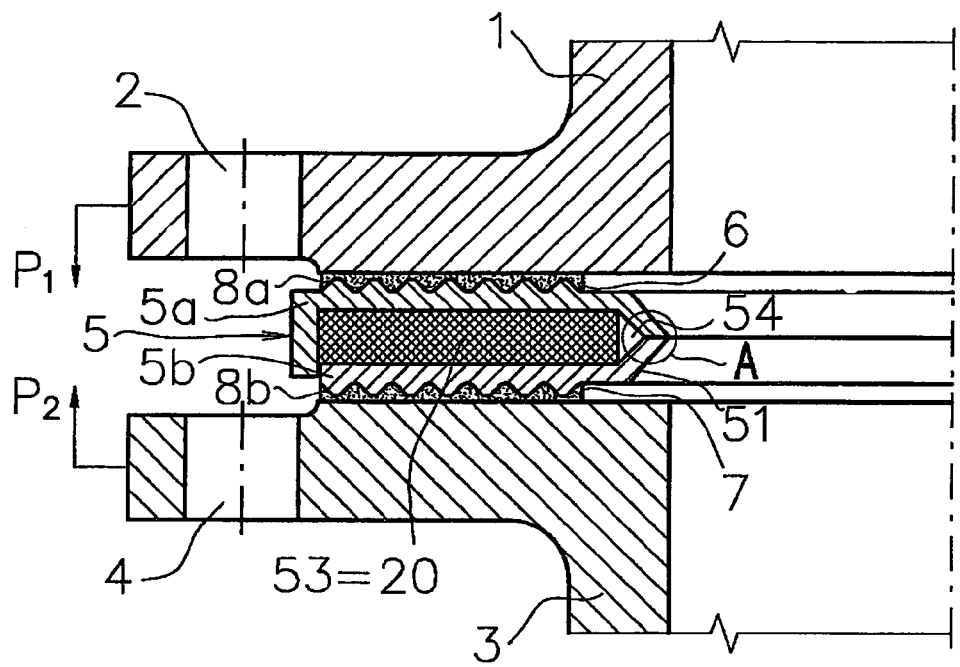
FIG. 7 shows a partial axial cross section of the flanges that connect the pipeline including the comb-like gasket and the sealing foil as shown in FIG. 5, with the comb-like gasket and the sealing foil in a compressed state between contact surfaces of the flanges.
Figure 9:
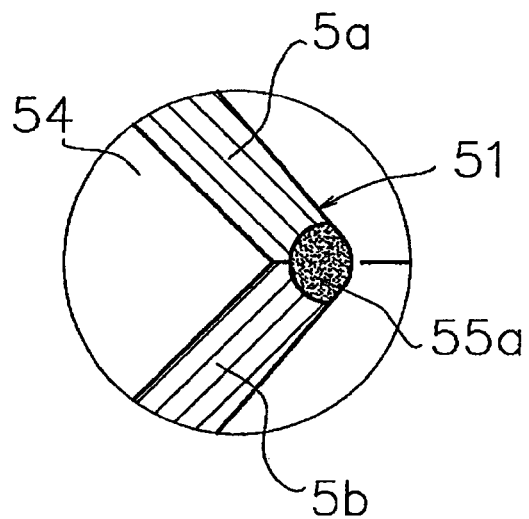
FIG. 9 shows a partial cross section as shown in FIG. 8 with the connection of the inner diameter being made by means of a weld.
Figure 8:
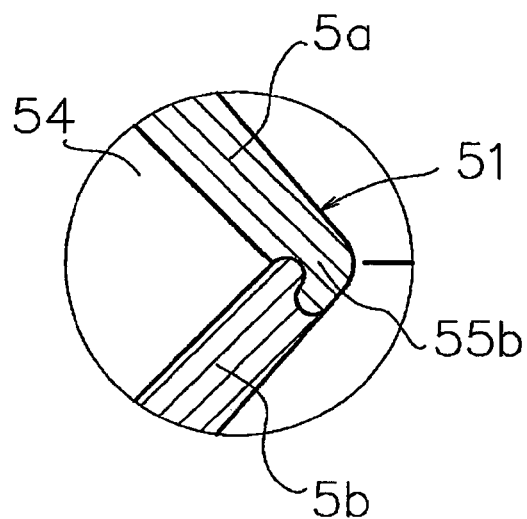
FIG. 8 shows an enlarged partial cross-section of detail "A" as shown in FIG. 5, representing a connection of annular flat parts of the comb-like gasket on an inner diameter by means of a locking offset.

In one embodiment, as shown in FIG. 5 and FIG. 7, the flange 1 at the end of the pipeline (not shown) is provided with the holes 2 designed to receive the connection screws (not shown). The lower flange 3 at the end of the joined pipeline is also provided with the holes 4 for receiving the connection screws (not shown). The annular comb-like gasket 5 is inserted into the space between the contact surfaces of flanges 1, 3. Both sides of the annular comb-like gasket 5 are overlain by a sealing foil or sealing plate 6, 7 which is also of an annular shape. The sealing foil or sealing plate 6, 7 has an outer as well as inner diameter that is preferably relatively identical with an inner and outer diameter of the annular comb-like gasket 5. The annular comb-like gasket 5 is made of two annular flat parts 5a, 5b and their inner diameter is ended at bend 51. Each of the annular flat parts 5a, 5b are preferably shaped as a mirror-image along the inner diameter and are not shaped as mirror images along their outer circumference. One of the annular flat parts, e.g. the part 5a, on the outer circumference is provided with vertical detent 52, which overlaps the outer circumference of the second oppositely arranged part 5b. The outer surface of the annular flat part 5a is provided with concentric grooves 8a, and the outer surface of the opposite annular flat part 5b is provided with concentric grooves 8b. At least one of the annular flat parts 5a, 5b, is provided with a recess on the inner surface provided with a recess which after assembly of both annular flat parts 5a, 5b forms a lockable chamber 53 having a rectangular or square shape. The lockable chamber 53 is formed due to the bend 51 and a fixed connection by the weld 55a, or by the locking offset 55b on the inner diameter of the mentioned annular flat sections 5a, 5b which ends in the direction to the inner diameter by a space 54 having a triangular shape.

In one embodiment, a springy insert 20 is inserted into the lockable chamber 53. The springy insert 20 may comprise of expanded graphite or other material with anti-extrusive properties that stabilize a preload placed on the comb-like gasket 5 upon assembly of the annular comb-like gasket 5. The springy insert 20 secures and/or stabilizes the preloaded comb-like gasket 5 while allowing for recovery of the original shape of the comb-like gasket 5 once the preload has been removed. The springy insert 20 may be rectangular or square. The thickness of the springy insert 20 is structurally dimensioned based upon the diameter of the flanged joint being sealed, the operational pressure and temperature of the medium flowing within the pipeline, the optimum axial compression of the flanges being connected in a direction illustrated by arrows $P_1$ and $P_2$, and also by taking into account the amount of axial preload shown graphically by the illustrated value W. The elasticity of the springy insert 20 and the surface flexibility provided by the annular flat parts 5a, 5b provide for adequate deformation to accommodate for non-parallelism of the contact surfaces of the connected flanges 1, 3, thereby providing a relatively perfect seal or sealing effect with long-term service life.

It should be appreciated that various embodiments of the invention as illustrated in FIGS. 1 through 9 and as described herein, maybe applicable for pressurised and under-pressurized pipeline systems in which, according to the operational needs, both the pressure as well as temperature of the medium being sealed is varying. Testing of such sealed flanged joints verified their reliability as well as their service life at pressures above 150 MPa and temperatures above 500° C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

LIST OF REFERENTIAL MARKINGS 1 upper flange
2 holes
3 lower flange
5 comb-like gasket
5a, 5b annular flat parts of comb-like gasket
51 bend
52 vertical detent
53 chamber
54 space of triangular shape
55a weld
55b locking offset
6, 7 sealing foil or plate
8 concentric grooves
8a, 8b concentric grooves
9 flange
10 holes
11 covering flange
12 holes
13 comb-like gasket
14 deeper concentric grooves
15 shallower concentric grooves
16 annular recess
17, 18 sealing foil or plate
20 springy insert
Y concentric surface
R radius of groove rounding
S groove depth
X layer of material

The invention claimed is:

1. A comb-like two-sided overlain gasket for sealing of dismountable flanged joints, comprising:
   two sealing contact surfaces, each contact surface defining a plurality of concentric grooves, each of the concentric grooves having an opening angle of 90 degrees, each of the contact surfaces having concentric surfaces created in a single plane and disposed between each of the concentric grooves, the concentric surfaces having a constant width from 0.2 mm to 0.6 mm, wherein a bottom portion of the concentric grooves are rounded and have a radius of 0.3 mm to 0.5 mm;
   one of a sealing foil or a sealing plate that overlays the sealing contact surfaces and that extends beyond the concentric grooves;
   wherein the concentric grooves define a smaller volume than the volume of the sealing foil or the sealing plate; and
   wherein each of the sealing contact surfaces are created on different non-unitary annular parts, each annular part having an inner diameter and an outer diameter, the inner diameters defining a bent portion that extends towards the other annular part, each bent portion being connected at a contact place and the outer diameters mutually overlap.

2. The comb-like two-sided overlain gasket as in claim 1, wherein each sealing contact surface comprises at least two groups of the concentric grooves, each group having a different depth and the individual groups of the concentric grooves are separated by a continuous recess that extends annularly around the comb-like gasket.

3. The comb-like two-sided overlain gasket as in claim 1, further comprising an adhesive disposed on the sealing contact surfaces between the gasket and the sealing foil or the sealing plate.

4. The comb-like two-sided overlain gasket as in claim 3, wherein the adhesive has a melting point of about 50° C.

5. The comb-like two-sided overlain gasket as in claim 1, further comprising an annular chamber defined between the annular parts, wherein the annular chamber is at least partially defined between the bent portions of the inner diameters and the mutually overlapping outer diameters.

6. The comb-like two-sided overlain gasket as in claim 1, wherein the connection of the bent portions of both annular parts is formed by a fixed edge joint.

7. The comb-like two-sided overlain gasket as in claim 1, wherein the connection of the bent portion of both annular parts is formed by a dismountable joint.

8. The comb-like two-sided overlain gasket as in claim 5, wherein the annular chamber comprises a square or rectangular cross-section.

9. The comb-like two-sided overlain gasket as in claim 1, wherein at least one of the two annular parts is elastic.

10. The comb-like two-sided overlain gasket as in claim 5, further comprising a springy insert disposed within the annular chamber.

11. The comb-like two-sided overlain gasket as in claim 10, wherein the springy insert comprises expanded graphite.

* * * * *